US011862365B2

(12) United States Patent
Yoon et al.

(10) Patent No.: US 11,862,365 B2
(45) Date of Patent: Jan. 2, 2024

(54) RESISTOR COMPONENT

(71) Applicant: SAMSUNG ELECTRO-MECHANICS CO., LTD., Suwon-si (KR)

(72) Inventors: Jang Suk Yoon, Suwon-si (KR); Hyung Min Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/743,766

(22) Filed: May 13, 2022

(65) Prior Publication Data

US 2023/0260682 A1 Aug. 17, 2023

(30) Foreign Application Priority Data

Feb. 11, 2022 (KR) ........................ 10-2022-0018242

(51) Int. Cl.
*H01C 1/14* (2006.01)
*H01C 7/00* (2006.01)

(52) U.S. Cl.
CPC ............... *H01C 1/14* (2013.01); *H01C 7/003* (2013.01)

(58) Field of Classification Search
CPC .................................. H01C 1/14; H01C 7/003
See application file for complete search history.

(56) References Cited

U.S. PATENT DOCUMENTS

| | | | | | |
|---|---|---|---|---|---|
| 5,680,092 | A * | 10/1997 | Yamada | H01C 7/006 | 338/308 |
| 7,782,173 | B2 * | 8/2010 | Urano | H01C 17/006 | 338/307 |
| 2004/0262712 | A1 * | 12/2004 | Doi | H01C 7/003 | 257/536 |
| 2009/0115569 | A1 * | 5/2009 | Urano | H01C 7/003 | 338/309 |
| 2018/0061533 | A1 | 3/2018 | Park et al. | | |
| 2019/0164672 | A1 | 5/2019 | Yun | | |

FOREIGN PATENT DOCUMENTS

| | | | |
|---|---|---|---|
| KR | 10-2017-0083335 | A | 7/2017 |
| KR | 10-2018-0025067 | A | 3/2018 |
| KR | 10-2019-0061946 | A | 6/2019 |

* cited by examiner

*Primary Examiner* — Kyung S Lee
(74) *Attorney, Agent, or Firm* — Morgan, Lewis & Bockius LLP

(57) ABSTRACT

A resistor component includes a substrate having a first surface and a second surface, opposing each other; an external electrode disposed outside of the substrate; a resistive layer disposed on the first surface of the substrate, connected to the external electrode, and including an alloy of a first metal and a second metal; and a first protective layer disposed on the resistive layer and including any one of the first and second metals.

21 Claims, 4 Drawing Sheets

I-I'

RESISTOR COMPONENT

CROSS-REFERENCE TO RELATED APPLICATION(S)

This application claims benefit of priority to Korean Patent Application No. 10-2022-0018242 filed on Feb. 11, 2022 in the Korean Intellectual Property Office, the disclosure of which is incorporated herein by reference in its entirety.

TECHNICAL FIELD

The present disclosure relates to a resistor component.

BACKGROUND

A resistor component may be a passive electronic component for realizing precision resistance, and may serve to control a current and drop a voltage in an electronic circuit. Among resistor components, a current sensing resistor (CSR), which may be mainly used as a current sensing resistor, requires constant resistance and a low temperature coefficient of resistivity (TCR) for more precisely detecting a current.

A resistor component may generally include a substrate supporting a resistive layer, an electrode connected to the resistive layer, and a protective layer protecting the resistive layer. Conventionally, the resistive layer may be formed of an Ag—Pd alloy or a Cu—Ni alloy, having a low temperature coefficient of resistivity (TCR), and the protective layer may include glass to prevent separation from the resistive layer, or may be formed of a resin or the like to effectively absorb external impacts.

However, during a sintering process, nickel (Ni) or copper (Cu) contained in an electrode may diffuse into the resistive layer to increase a temperature coefficient of resistivity (TCR). Accordingly, there is a problem in that a resistance value change rate of the resistor component may be increased to deteriorate reliability thereof. In addition, there is a problem in that rated power of the resistor component may be lowered because glass or the like included in the conventional protective layer may have lower heat dissipation than metal.

SUMMARY

An aspect of the present disclosure is to provide a resistor component having a low temperature coefficient of resistivity (TCR).

An aspect of the present disclosure is to provide a resistor component having excellent rated power by absorbing and dissipating heat generated in the resistor component.

An aspect of the present disclosure is to provide a resistor component having a low resistance value change rate.

According to an aspect of the present disclosure, a resistor component includes a substrate having a first surface and a second surface, opposing each other; an external electrode disposed outside of the substrate; a resistive layer disposed on the first surface of the substrate, connected to the external electrode, and including an alloy of a first metal and a second metal; and a first protective layer disposed on the resistive layer and including any one of the first and second metals.

According to an aspect of the present disclosure, a resistor component includes a substrate having a first surface and a second surface, opposing each other; an external electrode disposed outside of the substrate; a resistive layer disposed on the first surface of the substrate; and a first protective layer disposed on the resistive layer and including at least one of a first metal and a second metal.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
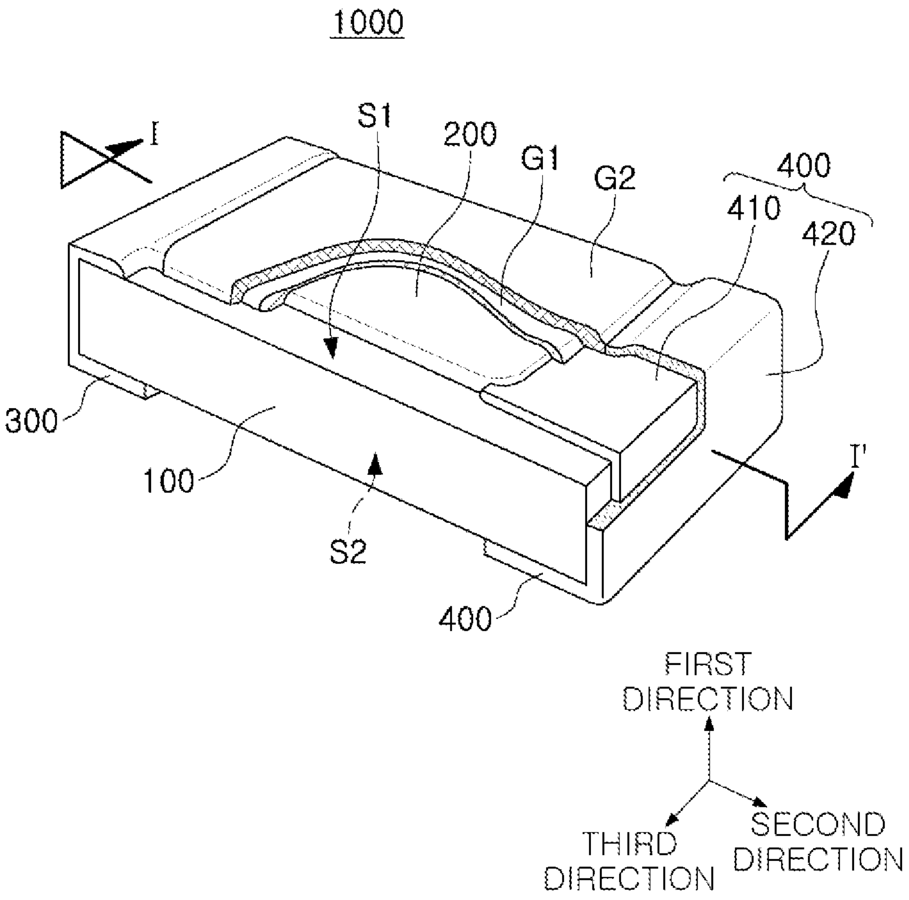
FIG. 1 is a perspective view of a resistor component according to an example.

Hereinafter, the present disclosure will be described with reference to the accompanying drawings. Shapes and sizes of elements in the drawings may be exaggerated or reduced for clarity of description.

In the drawings, a first direction may be defined as a thickness (T) direction, a second direction may be defined as a length (L) direction, and a third direction may be defined as a width (W) direction.

FIG. 1 is a perspective view of a resistor component according to an example.

Figure 2:
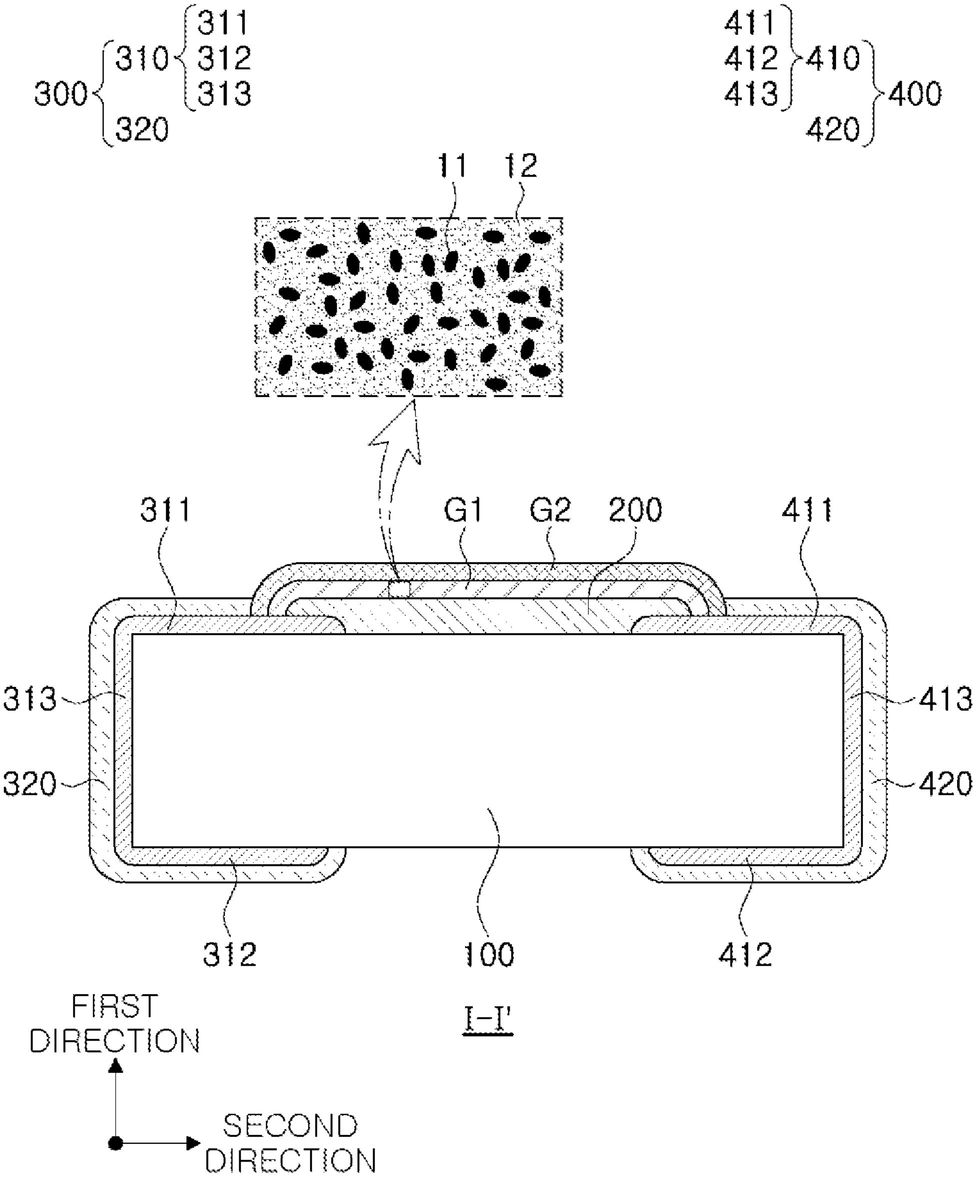
FIG. 2 is a cross-sectional view schematically illustrating FIG. 1, taken along line I-I'.

FIG. 2 is a cross-sectional view schematically illustrating FIG. 1, taken along line I-I'.

Figure 3:
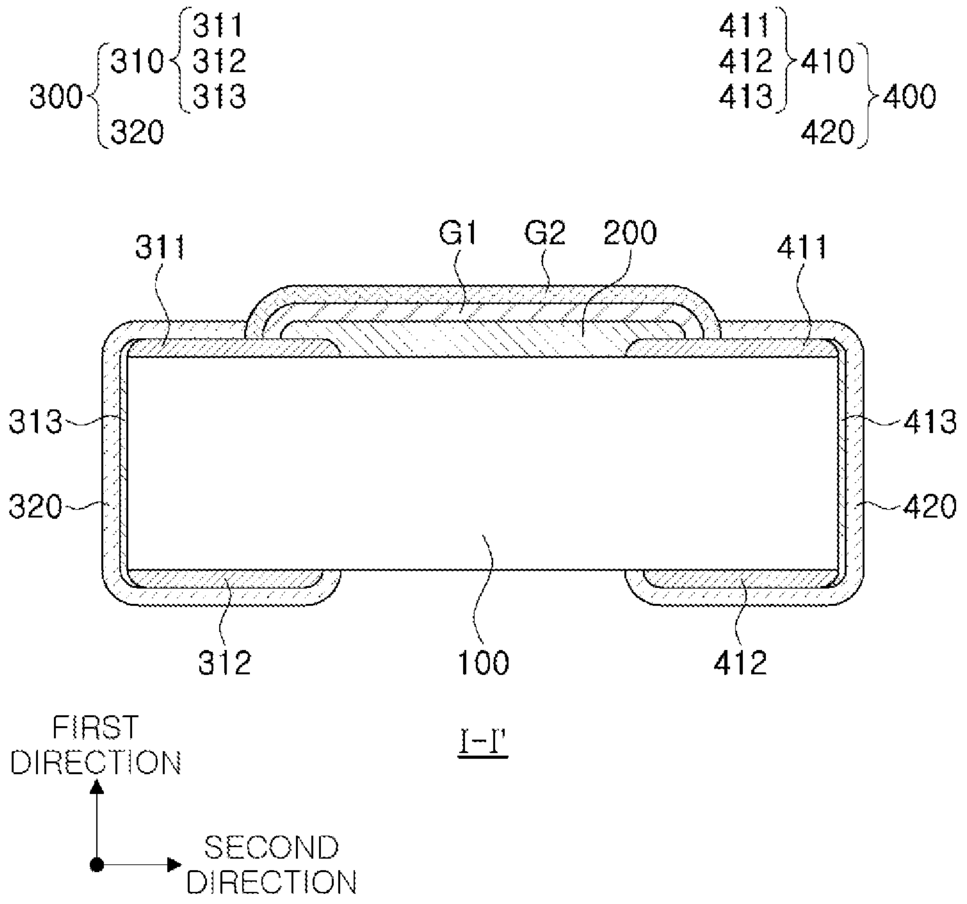
FIG. 3 is a cross-sectional view schematically illustrating an embodiment of a resistor component according to the present disclosure.

FIG. 3 is a cross-sectional view schematically illustrating an embodiment of a resistor component according to the present disclosure.

Figure 4:
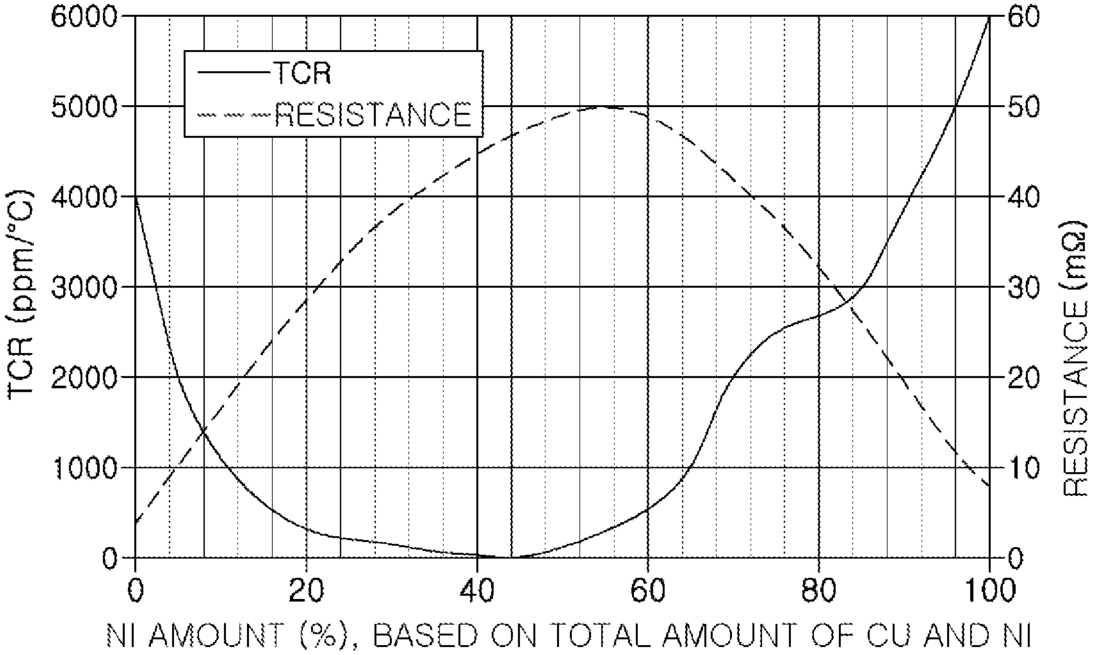
FIG. 4 is a graph illustrating a resistance value and a temperature coefficient of resistivity, according to a ratio of an amount of nickel (Ni) in a resistive layer relative to a total amount of copper (Cu) and nickel (Ni).

FIG. 4 is a graph illustrating a resistance value and a temperature coefficient of resistivity, according to a ratio of an amount of nickel (Ni) in a resistive layer relative to a total amount of copper (Cu) and nickel (Ni).

Referring to FIGS. 1 to 4, a resistor component 1000 according to an example may include a substrate 100 having a first surface and a second surface, opposing each other; an external electrodes 300 and 400 disposed outside of the substrate 100; a resistive layer 200 disposed on the first surface of the substrate 100, connected to the external electrode 300 or 400, including an alloy of a first metal and a second metal; and a first protective layer G1 disposed on the resistive layer 200 and including any one of the first and second metals.

As described above, during a sintering process, a first metal or a second metal included in external electrodes (e.g., 300 and 400) may diffuse into a resistive layer (e.g., 200) to increase an absolute value of a temperature coefficient of resistivity (TCR). Therefore, there is a problem in that reliability of a resistor component (e.g., 1000) may be deteriorated. In addition, there is a problem in that rated power of the resistor component (e.g., 1000) may be lowered because glass or the like included in a conventional protective layer may have lower heat dissipation than metal.

In a resistor component 1000 according to an example, any one of the first metal and the second metal included in the first protective layer G1 may diffuse into the resistive layer 200 during a sintering process. Therefore, the resistor component 1000 having a low absolute value of a temperature coefficient of resistivity (TCR) and excellent heat dissipation characteristics and rated power may be provided.

Hereinafter, each configuration included in a resistor component 1000 according to an example will be described in more detail.

The substrate 100 may be provided as a plate shape having a predetermined thickness, and may have first and second surfaces S1 and S2 opposing each other in the first direction. The substrate 100 may include a material capable of efficiently dissipating heat generated in the resistive layer 200 to be described later. The substrate 100 may include a ceramic insulating material such as alumina ($Al_2O_3$), but the present disclosure is not limited thereto, and may include a polymer material. For example, the substrate 100 may be an alumina substrate obtained by anodizing a surface of aluminum, but the present disclosure is not limited thereto, and may be a sintered alumina substrate.

The resistive layer 200 may be disposed on one surface of the substrate 100, for example, the first surface S1 of the substrate 100, and may be connected to the external electrodes 300 and 400. The resistive layer 200 may include at least one of the first metal or the second metal, an alloy of the first and second metals, or a metal oxide. For example, the resistive layer 200 may include at least one of an Ag—Pd alloy, a Cu—Ni alloy, a Ni—Cr-based alloy, Ru oxide, Si oxide, or an Mn-based alloy, and may include more preferably a Cu—Ni alloy, an alloy of copper (Cu) as the first metal and nickel (Ni)as the second metal.

An amount of the second metal in the resistive layer 200 may be 20 to 60 moles, based on 100 moles of a total amount of the first metal and the second metal. Taking the aforementioned Cu—Ni alloy as an example, when an amount of nickel (Ni) is 20 to 60 moles, based on 100 moles of the total amount of copper (Cu) and nickel (Ni), as illustrated in FIG. 4, an absolute value of a temperature coefficient of resistivity (TCR) may be close to 0, to decrease a resistance value change rate of the resistor component 1000 and improve reliability thereof. When an amount of nickel (Ni) is not within the defined ranges, an absolute value of a temperature coefficient of resistivity (TCR) may increase to deteriorate reliability of the resistor component 1000. As will be described later, the amount of the second metal in the resistive layer 200 may be controlled by the second metal diffused from the first protective layer G1. In this case, measurement of the amount of the second metal included in the resistive layer 200 may be, for example, carried out by scanning cross-sections of the resistive layer 200 in the first and second directions using a scanning electron microscope (SEM), and analyzing the same with energy dispersive spectroscopy (EDS).

The resistive layer 200 may be formed by a thick film process. For example, the resistive layer 200 may be formed by applying a paste for forming a resistive layer including an alloy of the first and second metals on the first surface S1 of the substrate 100 using a process such as screen-printing or the like, and firing the same.

The first protective layer G1 may be disposed on the resistive layer 200 to protect the resistive layer 200 from an external environment. In particular, the first protective layer G1 may serve to minimize damage to the resistive layer 200 during a trimming process. The first protective layer G1 may be disposed in a region between a first external electrode 300 and a second external electrode 400, which will be described later, and may cover a portion of each of the first external electrode 300 and the second external electrode 400 according to a design. In addition, the first protective layer G1 may be disposed to extend over at least a portion of first electrodes 310 and 410, which will be described later.

The first protective layer G1 may include at least one of the first metal and the second metal. More specifically, the first protective layer G1 may include a plurality of aggregates 11 of particles of any one of the first metal and the second metal. The first metal and the second metal may be, for example, copper (Cu) and nickel (Ni), respectively. The first protective layer G1 may serve to absorb and dissipate heat generated in the resistive layer 200 by including a metal component having excellent heat dissipation. Therefore, rated power of the resistor component 1000 may be improved. An average particle size (D50) of the aggregates 11 may be 2 μm to 10 μm in consideration of heat dissipation characteristics, but the present disclosure is not limited thereto. The average particle size of the aggregates 11 may be measured by various processes, such as diameter measurement or the like using a scanning electron microscope (SEM) image.

The at least one of the first metal and the second metal may be an additive in the first protective layer.

The first protective layer G1 may include at least one of the first metal and the second metal, to reduce the absolute value of the temperature coefficient of resistivity (TCR) of the resistive layer 200 and the resistance value change rate. When the resistive layer 200 includes, for example, a Cu—Ni alloy, and an amount of nickel (Ni) included in the resistive layer 200 is 20 to 60 moles, based on 100 moles of a total amount of copper (Cu) and nickel (Ni), as illustrated in FIG. 4, the absolute value of the temperature coefficient of resistivity (TCR) may be close to 0. In this case, in a sintering process, a phenomenon in which copper (Cu) or nickel (Ni) included in the external electrode 300 or 400 is diffused into the resistive layer 200 should be considered. For example, amount ratios of copper (Cu) and nickel (Ni) in the resistive layer 200 may be changed according to diffusion of copper (Cu) or nickel (Ni) included in the external electrode 300 or 400. Therefore, as an amount of nickel (Ni) may be lower or higher than a total amount of copper (Cu) and nickel (Ni), the absolute value of the temperature coefficient of resistivity (TCR) may increase to reduce reliability of the resistor component 1000. In this case, the first protective layer G1 may include at least one of copper (Cu) or nickel (Ni) to offset a change in the temperature coefficient of resistivity (TCR) due to diffusion. Moreover, the resistance value change rate by sintering may be reduced.

For example, when the external electrodes 300 and 400 include copper (Cu), the copper (Cu) included in the external electrodes 300 and 400 may be diffused into the resistive layer 200 to decrease an amount of nickel (Ni), compared to a total amount of copper (Cu) and nickel (Ni). In this case, when the first protective layer G1 includes nickel (Ni), the nickel (Ni) included in the first protective layer G1 may be also diffused into the resistive layer 200 during a sintering process, to increase an amount of nickel (Ni), compared to a total amount of copper (Cu) and nickel (Ni). Therefore, a change in ratio of the nickel (Ni) may be offset to constantly maintain ratios of copper (Cu) and nickel (Ni) during the sintering process, and an increase in absolute value of the temperature coefficient of resistivity (TCR) by diffusion of copper (Cu) from the external electrode 300 or 400 may be suppressed. In addition, ratios of copper (Cu) and nickel (Ni)

in the sintering process by diffusion of nickel (Ni) from the first protective layer G1 may be constantly maintained to reduce a change rate in resistance value of the resistive layer 200 by the sintering.

For example, when the external electrodes 300 and 400 includes nickel (Ni), the nickel (Ni) included in the external electrodes 300 and 400 may be diffused into the resistive layer 200 to increase an amount of nickel (Ni), compared to a total amount of copper (Cu) and nickel (Ni). In this case, when the first protective layer G1 includes copper (Cu), the copper (Cu) included in the first protective layer G1 may be also diffused into the resistive layer 200 during a sintering process, to decrease an amount of nickel (Ni), compared to a total amount of copper (Cu) and nickel (Ni). Therefore, a change in ratio of the nickel (Ni) may be offset to constantly maintain ratios of copper (Cu) and nickel (Ni) during the sintering process, and an increase in absolute value of the temperature coefficient of resistivity (TCR) by diffusion of nickel (Ni) from the external electrodes 300 and 400 may be suppressed. In addition, ratios of copper (Cu) and nickel (Ni) in the sintering process by diffusion of copper (Cu) from the first protective layer G1 may be constantly maintained to reduce a change rate in resistance value of the resistive layer 200 by the sintering.

The first protective layer G1 may be formed by applying a paste for forming a first protective layer including a glass component, a resin component, a solvent, and at least one of the first metal and the second metal or any one of the first metal powder and the second metal powder, which will be described later, on the resistive layer 200 or on the substrate 100 on which the first electrodes 310 and 410 are formed, and then sintering the same. In some embodiments, the paste may include at least one of the first metal and the second metal and at least one of a glass component, a resin component, and a solvent. The metal powder particles may be agglomerated during the sintering process. Therefore, the first protective layer G1 may include agglomerates 11 of any one of the first metal and the second metal, and glass 12. The glass 12 may include, for example, at least one of $SiO_2$, BaO, $B_2O_3$, CaO, $Al_2O_3$, or ZnO, and may be fired in the same reducing atmosphere and temperature as the resistive layer 200. A sintering temperature may be 800° C. to 900° C., but the present disclosure is not limited thereto.

An amount of the second metal powder in the paste for forming the first protective layer may be at least 10 wt % or 10 wt % to 30 wt %, based on a total weight of the paste for forming the first protective layer. For example, an amount of the nickel (Ni) powder may be 10 wt % to 30 wt %, based on a total weight of the paste for forming the first protective layer. Therefore, a temperature coefficient of resistivity (TCR) and a resistance value change rate due to sintering may be reduced. When an amount of the nickel (Ni) powder is less than 10 wt %, based on a total weight of the paste for forming the first protective layer, effects of reducing the temperature coefficient of resistivity (TCR) and the change rate of resistance value due to sintering may be insignificant. When an amount of the nickel (Ni) powder exceeds 30 wt %, based on a total weight of the paste for forming the first protective layer, trimming properties may be deteriorated.

A resistor component 1000 according to an example may include a second protective layer G2 disposed on the first protective layer G1. The second protective layer G2 may serve to protect the resistive layer 200 from external impact, together with the first protective layer G1, and may include a thermosetting resin and/or a photocurable resin to effectively absorb the external impact. The second protective layer G2 may be formed by applying a curable paste including a resin component to the first protective layer G1 and the substrate 100, and curing the same.

The external electrodes 300 and 400 may include a first external electrode 300 and a second external electrode 400 respectively disposed on a side surface of the substrate 100, for example, on both side surfaces opposing in the second direction. In addition, the external electrodes 300 and 400 may include first electrodes 310 and 410 disposed on the substrate 100, and second electrodes 320 and 420 respectively disposed on the first electrodes 310 and 410. Specifically, the first electrodes 310 and 410 may be disposed on both side surfaces of the substrate 100 opposing each other in the second direction, and may be extended to portions of the first and second surfaces S1 and S2 of the substrate 100, respectively. From this point of view, the first electrodes 310 and 410 may include upper electrodes 311 and 411 disposed on the first surface S1 of the substrate 100, lower electrodes 312 and 412 disposed on the second surface S2 of the substrate 100, and side electrodes 313 and 413 respectively disposed on a side surface of the substrate 100 to respectively connect the upper electrodes 311 and 411 and the lower electrodes 312 and 412.

In this case, the resistive layer 200 may extend onto the first electrodes 310 and 410 extending to the first and second surfaces S1 and S2. For example, the resistive layer 200 may cover at least a portion of each of the upper electrodes 311 and 411. Therefore, the first protective layer G1 may be in contact with at least a portion of each of the first electrodes 310 and 410, and the second protective layer G2 may be in contact with at least a portion of each of the first electrodes 310 and 410 and at least a portion of each of the second electrodes 320 and 420. Therefore, connectivity between the resistive layer 200 and the external electrodes 300 and 400 may be improved, and the first and second protective layers G1 and G2 may effectively protect the resistive layer 200.

The first electrodes 310 and 410 may be formed by applying a conductive paste to the side surface of the substrate 100 and a portion of each of the first and second surfaces S1 and S2, and then sintering the same. Therefore, the first electrodes 310 and 410 may be fired electrodes including a conductive metal and glass. The conductive metal of the first electrodes 310 and 410 may include copper (Cu), silver (Ag), nickel (Ni) and/or an alloy thereof, and may more preferably include copper (Cu) and/or nickel (Ni).

Referring to FIG. 3, in an embodiment, upper electrodes 311 and 411 and lower electrodes 312 and 412 may be sintered electrodes including a conductive metal and glass, and side electrodes 313 and 413 may be sputtered layers formed by sputtering. In this case, the side electrodes 313 and 413 may be formed on a side surface of the substrate 100, a portion of each of the upper electrodes 311 and 411, and a portion of each of the lower electrodes 312 and 412, and may include, for example, nickel (Ni)-chromium (Cr) alloy. When the side electrodes 313 and 413 include a Ni—Cr alloy, adhesion to the substrate 100 may be improved, and a resistor component 1000 may be miniaturized by reducing a thickness of an external electrodes 300 and 400. In this case, an average thickness of the side electrodes 313 and 413 may be to 100 nm. The thicknesses of the side electrodes 313 and 413 refer to lengths of the side electrodes 313 and 413 in the second direction, and the average thickness may be determined by measuring thicknesses at 10 points in cross-sections of the resistor component 1000 in the first and second directions, equally spaced in the first direction.

Types of the second electrodes 320 and 420 are not specifically limited, may be plating layers including at least one of nickel (Ni), tin (Sn), or palladium (Pd) as a conductive metal to improve mounting characteristics, and may be formed as a plurality of layers. The second electrodes 320 and 420 may be, for example, a nickel (Ni) plating layer or a tin (Sn) plating layer, or may be a structure in which the nickel (Ni) plating layer and the tin (Sn) plating layer are sequentially formed. In addition, the second electrodes 320 and 420 may include a plurality of nickel (Ni) plating layers and/or a plurality of tin (Sn) plating layers. The nickel (Ni) plating layer may prevent dissolution of a solder, and may act as a barrier to suppress electron movement in tin (Sn), and the tin (Sn) plating layer may play a role of improving wettability of a solder.

Experimental Example

In the Example and Comparative Example, copper (Cu) was included as a first metal, nickel (Ni) was included as a second metal, and all other conditions were equal to each other. In the Example including a first protective layer and the Comparative Example not including a first protective layer, 38 samples were prepared, respectively, and resistance value change rates of the samples according to a change in applied voltages were determined. The applied voltages corresponded to 2.5 times, 3.0 times, and 3.5 times of a rated voltage (RV), respectively, and an average value of resistance value change rates was determined when voltage are applied to the samples of each of the Example and Comparative Example.

Figure 5:
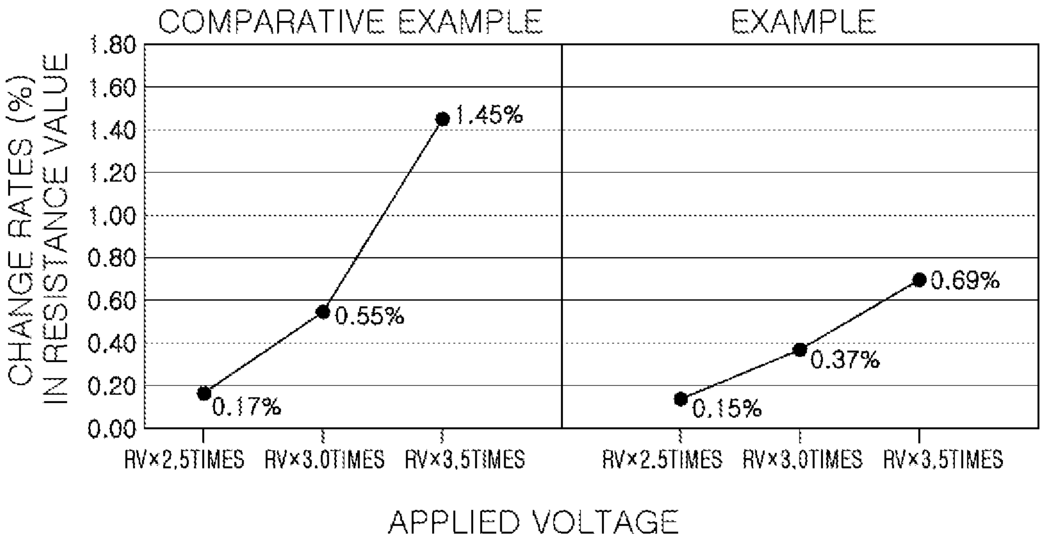
FIG. 5 is a graph illustrating resistance value change rates of an Example and a Comparative Example according to an applied voltage.

FIG. 5 is a graph illustrating resistance value change rates of the Example and Comparative Example according to an applied voltage. Referring to FIG. 5, it can be confirmed that, in the Example, when applied voltages were 2.5 times, 3.0 times, and 3.5 times a rated voltage (RV), average values of resistance value change rates were 0.15%, 0.37%, and 0.69%, respectively, and in the Comparative Example, average values of resistance value change rates were 0.17%, 0.55%, and 1.45%, respectively. That is, it can be confirmed that resistance value change rates in the Example, according to applied voltages, were lower than that of the Comparative Example, and it can be confirmed that the Example had superior rated power characteristics than the Comparative Example.

Absolute values of the temperature coefficient of resistivity (TCR) according to an amount of nickel (Ni and change rates in resistance value of the resistive layer 200 according to sintering, based on a total weight of a paste for forming the first protective layer G1, were determined. The change rates in resistance value according to sintering means rates at which resistance values change, in a process of applying a paste for forming a first protective layer G1 on a substrate 100 on which first electrodes 310 and 410 and a resistive layer 200 were formed, and then sintering the same. After preparing 38 samples each having 0 wt %, 10 wt %, 20 wt %, 30 wt %, and 40 wt % of nickel (Ni) amount relative to a total weight of the paste for forming the first protective layer G1, absolute values of the temperature coefficient of resistivity (TCR) of the resistive layer 200 were determined and are illustrated in Table 1. The absolute values of the temperature coefficient of resistivity (TCR) were determined by measuring the resistances values over a temperature range of 20*r* to 125*r*. In addition, resistance value change rates of the resistive layer 200, before and after sintering of the first protective layer G1, were determined and are illustrated in Table 1.

TABLE 1

| Nickel (Ni) Amount (wt %) | TCR Absolute Value (ppm/° C.) | Resistance Value Change Rates (%) according to Sintering |
|---|---|---|
| 0 | 99 | −9.6 |
| 10 | 60 | −2.5 |
| 20 | 37 | 1.0 |
| 30 | 26 | 2.2 |
| 40 | 20 | 2.3 |

Referring to Table 1, it can be seen that absolute values of the temperature coefficient of resistivity (TCR) gradually decreased as an amount of nickel (Ni) included in the paste for forming the first protective layer G1 increases. This may be because a change in ratios of copper (Cu) and nickel (Ni) included in the resistive layer 200 offsets, as the nickel (Ni) included in the first protective layer G1 may be diffused into the resistive layer 200 during the sintering process to diffuse copper (Cu) included in the first electrodes 310 and 410 into the resistive layer 200.

In addition, it can be seen that as nickel (Ni) included in the paste for forming the first protective layer G1 is included, a change in ratios of copper (Cu) and nickel (Ni) included in the resistive layer 200 offsets during the sintering process to reduce change rates of resistance values of the resistive layer 200. When an amount of nickel (Ni) included in the paste for forming the first protective layer G1 exceeds 30 wt %, effects of reducing the resistance value change rate may be insignificant, and trimming characteristics may be deteriorated. Therefore, it can be seen that an amount of nickel (Ni) included in the paste for forming the first protective layer G1 is preferably 10 wt % to 30 wt %, based on a total weight of the paste for forming the first protective layer. As the above conditions are satisfied, a resistor component 1000 having high reliability may be provided.

In the present disclosure, expressions such as a side portion, a side surface, or the like may be used to refer to a left or right direction or a portion or surface in the direction, based on the drawings for convenience of description, expressions such as an upper side, an upper portion, an upper surface, or the like may be used to refer to an upward direction or a portion or surface in the direction, based on the drawings for convenience of description, and expressions such as a lower side, a lower portion, a lower surface, or the like may be used to refer to a downward direction or a portion or surface in the direction for convenience of description. In addition, positioning on the side portion, the upper side, the upper portion, the lower side, or the lower portion may be used not only when a target component is in direct contact with a reference component in a direction corresponding thereto, but also when the target component is located in the corresponding direction but is not in direct contact with the reference component. However, this is a definition of the direction for convenience of description, and the scope of the claims is not particularly limited by the description of this direction, and the concept of upward/downward direction or the like may be switched at any time.

The term "connect" or "connection" in the present specification may not be only a direct connection, but also a concept including an indirect connection through an adhesive layer or the like. In addition, the term "electrically connected" or "electrical connection" in the present specification is a concept including both a physical connection and a physical non-connection. In addition, the expressions of "first," second," etc. in the present specification are used to distinguish one component from another, and do not limit the order and/or importance of the components. In some cases, without departing from the spirit of the present disclosure, a "first" component may be referred to as a "second" component, and similarly, a "second" component may be referred to as a "first" component.

The expression "example" used in this specification does not refer to the same embodiment to each other, but may be provided for emphasizing and explaining different unique features. However, the above-mentioned examples do not exclude that the above-mentioned examples are implemented in combination with the features of other examples. For example, although the description in a specific example is not described in another example, it can be understood as an explanation related to another example, unless otherwise described or contradicted by the other example.

The terms used in the present disclosure are used only to illustrate various examples and are not intended to limit the presently disclosed concept. Singular expressions include plural expressions unless the context clearly dictates otherwise.

As one effect among various effects of the present disclosure, a resistor component having a low temperature coefficient of resistivity (TCR) may be provided.

As one effect among the various effects of the present disclosure, a resistor component having excellent rated power by absorbing and dissipating heat generated in the resistor component may be provided.

As one effect among various effects of the present disclosure, a resistor component having a low resistance value change rate may be provided.

While example embodiments have been illustrated and described above, it will be apparent to those skilled in the art that modifications and variations could be made without departing from the scope of the present disclosure as defined by the appended claims.

What is claimed is:

1. A resistor component comprising:

a substrate having a first surface and a second surface, opposing each other;

an external electrode disposed outside of the substrate;

a resistive layer disposed on the first surface of the substrate, connected to the external electrode, and including an alloy of a first metal and a second metal; and a first protective layer directly disposed on the resistive layer and including any one of the first and second metals, wherein the first protective layer covers an entire surface of the resistive layer facing away from the first surface.

2. The resistor component of claim 1, wherein the first protective layer comprises a plurality of aggregates of particles of any one of the first metal and the second metal.

3. The resistor component of claim 1, wherein the first metal is copper (Cu), and the second metal is nickel (Ni).

4. The resistor component of claim 3, wherein an amount of the second metal in the resistive layer is 20 to 60 moles, based on 100 moles of a total amount of the first metal and the second metal.

5. The resistor component of claim 1, further comprising a second protective layer disposed on the first protective layer.

6. The resistor component of claim 1, wherein the first protective layer further including glass.

7. The resistor component of claim 5, wherein the second protective layer comprises a resin.

8. The resistor component of claim 1, wherein the external electrode comprises a first electrode disposed on the substrate, and a second electrode disposed on the first electrode.

9. The resistor component of claim 8, wherein the first electrode is disposed on a side surface of the substrate and extends to a portion of each of the first and second surfaces of the substrate, and the resistive layer extends over the first electrode.

10. The resistor component of claim 8, further comprising a second protective layer disposed on the first protective layer, wherein the first protective layer is in contact with at least a portion of the first electrode, and the second protective layer is in contact with at least a portion of the first electrode and at least a portion of the second electrode, respectively.

11. The resistor component of claim 8, wherein the first electrode comprises a conductive metal and glass, and the second electrode comprises a conductive metal.

12. The resistor component of claim 11, wherein the conductive metal of the first electrode comprises copper (Cu) or nickel (Ni), and the conductive metal of the second electrode comprises at least one of nickel (Ni), tin (Sn), and palladium (Pd).

13. The resistor component of claim 11, wherein the second electrode has a multilayer structure including a first layer including nickel (Ni) as the conductive metal and a second layer including tin (Sn) as the conductive metal.

14. The resistor component of claim 8, wherein the first electrode comprises an upper electrode disposed on the first surface of the substrate, a lower electrode disposed on the second surface of the substrate, and a side electrode disposed on a side surface of the substrate and connecting the upper electrode and the lower electrode, wherein the resistive layer covers a portion of the upper electrode.

15. The resistor component of claim 14, wherein the side electrode is a sputtered layer.

16. A resistor component comprising:

a substrate having a first surface and a second surface, opposing each other;

an external electrode disposed outside of the substrate;

a resistive layer disposed on the first surface of the substrate; and a first protective layer directly disposed on the resistive layer and including at least one of a first metal and a second metal, wherein the first protective layer covers an entire surface of the resistive layer facing away from the first surface.

17. The resistor component of claim 16, wherein the at least one of the first metal and the second metal is an additive in the first protective layer.

18. A method for manufacturing the resistor component of claim 16 comprising:

forming the first protective layer including applying a paste including at least one of the first metal and the second metal on the resistive layer.

19. The method of claim 18, wherein the second metal is present in an amount of at least 10 wt %, based on a total weight of the paste.

20. The method of claim 18, wherein the second metal is present in an amount of 10 wt % to 30 wt %, based on a total weight of the paste.

21. The method of claim 18, wherein the paste further includes at least one of a glass component, a resin component, and a solvent.

* * * * *